US012760565B2

(12) United States Patent
Zillert et al.

(10) Patent No.: US 12,760,565 B2
(45) Date of Patent: Oct. 13, 2026

(54) MOTOR VEHICLE LOCK FOR A CLOSING ELEMENT OF A MOTOR VEHICLE

(71) Applicant: Brose Schliesssysteme GmbH & Co. Kommanditgesellschaft, Wuppertal (DE)

(72) Inventors: Markus Zillert, Duesseldorf (DE); Andreas Hoffmann, Voerde (DE)

(73) Assignee: Brose Schliesssysteme GmbH & Co. Kommanditgesellschaft, Wuppertal (DE)

( * ) Notice: Subject to any disclaimer, the term of this patent is extended or adjusted under 35 U.S.C. 154(b) by 2 days.

(21) Appl. No.: 18/955,493

(22) Filed: Nov. 21, 2024

(65) Prior Publication Data

US 2025/0172020 A1 May 29, 2025

(30) Foreign Application Priority Data

Nov. 24, 2023 (DE) ..................... 10 2023 132 817.4

(51) Int. Cl.
*E05B 81/16* (2014.01)
*E05B 81/06* (2014.01)
*E05B 81/46* (2014.01)

(52) U.S. Cl.
CPC .............. *E05B 81/16* (2013.01); *E05B 81/06* (2013.01); *E05B 81/46* (2013.01)

(58) Field of Classification Search
CPC .......... E05B 81/16; E05B 81/06; E05B 81/46; E05B 81/14; E05B 77/26; E05B 77/28
(Continued)

(56) References Cited

U.S. PATENT DOCUMENTS 6,681,606 B2 * 1/2004 Baukholt ................ E05B 85/01 70/257
10,132,106 B2 * 11/2018 Rosales ................... E05B 77/54
(Continued)

FOREIGN PATENT DOCUMENTS

| | | |
|---|---|---|
| DE | 10149478 | 7/2003 |
| DE | 102018102874 | 8/2019 |
| EP | 2799648 | 10/2020 |

OTHER PUBLICATIONS

"DE Search Report," for German Patent Application No. 102023132817.4 mailed Nov. 15, 2024 (10 pages) no English translation.

*Primary Examiner* — Nathan Cumar
(74) *Attorney, Agent, or Firm* — Pauly, DeVries Smith & Deffner LLC

(57) ABSTRACT

A vehicle lock for a closing element of a vehicle. The vehicle lock has a locking mechanism, a release lever and at least two actuating sections. A first actuating section has a first clutch, a first adjustment mechanism and a first actuating lever, wherein the first clutch is adjustable into a decoupled state and into a coupled state, wherein the first clutch decouples the first actuating lever and the release lever from each other in the decoupled state and couples them to each other in the coupled state. A second actuating section has a second clutch, a second adjustment mechanism and a second actuating lever, wherein the second clutch is adjustable into a decoupled state and into a coupled state, wherein the second clutch decouples the second actuating lever and the release lever from each other in the decoupled state and couples them to each other in the coupled state.

20 Claims, 5 Drawing Sheets

(58) Field of Classification Search
USPC .......................................................... 292/200
See application file for complete search history.

(56) References Cited

U.S. PATENT DOCUMENTS

| | | | | |
|---|---|---|---|---|
| 10,370,874 | B2 * | 8/2019 | Rosales | E05B 79/22 |
| 11,428,031 | B2 * | 8/2022 | Rosales | E05B 81/16 |
| 11,536,059 | B2 * | 12/2022 | Rosales | E05B 81/14 |
| 11,619,078 | B2 * | 4/2023 | Rosales | E05B 81/20 292/201 |
| 11,643,851 | B2 * | 5/2023 | Kothe | E05B 79/10 292/45 |
| 12,448,821 | B2 * | 10/2025 | Graute | E05B 15/04 |
| 2003/0074935 | A1 * | 4/2003 | Baukholt | E05B 81/06 70/257 |
| 2016/0258194 | A1 * | 9/2016 | Rosales | E05B 77/06 |
| 2022/0275668 | A1 * | 9/2022 | Escamilla Hernandez | E05B 81/90 |

* cited by examiner

MOTOR VEHICLE LOCK FOR A CLOSING ELEMENT OF A MOTOR VEHICLE

CLAIM OF PRIORITY

This application claims the benefit of German Patent application No. DE 10 2023 132 817.4 filed on Nov. 24, 2023, the disclosure of which is incorporated herein by reference in its entirety.

FIELD OF THE TECHNOLOGY

Various embodiments relate to a motor vehicle lock for a closing element of a motor vehicle and to a method for operating a motor vehicle lock.

BACKGROUND

From the prior art, motor vehicle locks are generally known in different embodiments. From EP 2 799 648 A1, for instance, a motor vehicle lock with a locking mechanism and a release lever is known, by which a closing element designed as a side door can be locked. The locking mechanism has here by way of example a lock striker plate and a locking pawl. By actuating the release lever, the locking mechanism can be triggered, wherein the lock striker plate is released from the locking pawl, pivoted and thus releases a closing element, such as a striker. In the known motor vehicle lock, it is provided that the actuation of the release lever is carried out either via an internal actuator or via an external actuator. The actuation can therefore always be carried out via different actuating sections of the motor vehicle lock. In order to prevent unintentional opening of the motor vehicle lock (and ultimately also of the closing element), the motor vehicle lock has a clutch, which can separate the release lever from the internal actuator and the external actuator as required.

SUMMARY

In the case of relatively modern motor vehicle locks, which are the starting point of some embodiments, with locking mechanism, release lever and several actuating sections, instead of a single clutch, via which the actuating sections can be—quasi jointly—disconnected, several clutches are frequently provided. A first actuating section, such as an internal actuating section, may comprise a first clutch, a first adjustment mechanism and a first actuating lever to which, for example, the internal actuator can be attached. The first clutch can be adjusted into a decoupled state and into a coupled state via the first adjustment mechanism. In the decoupled state, the first actuating lever and the release lever are decoupled from each other. It is not possible to actuate the release lever via the first actuating lever in this state. In the coupled state, in turn, the first actuating lever and the release lever are coupled to each other, with the result that the release lever can be actuated accordingly via the first actuating lever. A second actuating section, for example for external actuation, may comprise a second clutch, a second adjustment mechanism and a second actuating lever to which, for example, the external actuator can be attached. The second clutch can be correspondingly adjusted via the second adjustment mechanism into a decoupled state and into a coupled state, in which a corresponding decoupling or coupling between the second actuating lever and the release lever takes place.

Although such motor vehicle locks with “individually” couplable actuating sections could prove themselves highly for a multiplicity of applications, there are regularly also certain challenges with regard to operational safety in their case, especially due to the individual clutches. For example, it is conceivable that a user opens the motor vehicle from the outside, for example manually via a locking mechanism. Here, the second clutch is adjusted into the decoupled state, wherein it must be ensured that, in addition to the second clutch, the first clutch is also properly adjusted into the coupled state, since otherwise the closing element, for example a side door, can be opened from the outside, but not from the inside. This would be particularly critical as it would allow the user to lock themselves inside the motor vehicle without noticing beforehand.

Against this background, various embodiments are based on the problem of creating a motor vehicle lock which is characterized by improved operational safety.

The above problem is solved by various features described herein.

The motor vehicle lock in question can be assigned to very different closing elements of a motor vehicle. The term “closing element” is therefore to be understood broadly and includes, in particular, a side door, a tailgate, a trunk lid, a hood, a cargo compartment flap, a window pane, an elevating roof or the like of a motor vehicle. Regardless of which closing element the motor vehicle lock is assigned to, the motor vehicle lock allows the closing element to be kept closed or released.

The basic consideration of providing a mechanical clutch locking device, by which the adjustment of the clutches can be permanently coupled, is essential. The clutch locking device ensures that adjusting the second clutch from the decoupled state into the coupled state inevitably also requires adjusting the first clutch from the decoupled state into the coupled state—at least in the event that the first clutch and the second clutch are each in the decoupled state before adjusting. In this case, either adjusting the second clutch can cause the first clutch to be adjusted, or adjusting the first clutch can cause the second clutch to be adjusted. In contrast to the known motor vehicle locks of the prior art, it cannot occur in this respect that only one of the two clutches, in particular the second clutch, is inadvertently adjusted into the coupled state and the other of the two clutches, in particular the first clutch, remains in the decoupled state. Instead, the clutch locking device ensures that adjusting one of the clutches, in particular the second clutch, is also accompanied by adjusting the other clutch, in particular the first clutch. The mechanical design of the clutch locking device can prevent or at least minimize failures of the permanent coupling.

In particular, it is proposed that the motor vehicle lock has a mechanical clutch locking device, via which the adjustment of the second clutch from the decoupled state into the coupled state can be permanently coupled, in particular is permanently coupled, to the adjustment of the first clutch from the decoupled state into the coupled state.

An embodiment provides that the permanent coupling is realized by decoupling the second clutch from the second adjustment mechanism and coupling it to the first clutch via the clutch locking device. This reliably ensures that the adjustment of the second clutch from the decoupled into the coupled state necessarily requires the adjustment of the first clutch from the decoupled into the coupled state. This prevents the second clutch from being adjusted exclusively via the second adjustment mechanism, which can then possibly lead to a malfunction of the motor vehicle lock.

In various embodiments, it can be advantageously proposed that the securing movement is effected by adjusting the first clutch. In this respect, the securing movement does not take place in a separate movement here, but with or in the course of adjusting the first clutch by the first adjustment mechanism. Such a passive clutch locking device, which for instance does not require a separate drive movement, etc., can be implemented in a relatively simple design and can also be more operationally reliable. In the event that the adjustment of the second clutch by the second adjustment mechanism takes place in time before the securing movement, it is an advantageous result that the second actuating lever can be already decoupled from the release lever in time before and thus also independently of the securing movement. This allows certain functions of the motor vehicle lock, such as a central locking system, to be formed.

Various embodiments can relate to an advantageous refinement of the motor vehicle lock concerning the first and second clutch. The clutches can each have, in a simple and likewise functional design, a movable clutch element, on the position of which the respective state of the clutch can depend. It is particularly advantageous if the second clutch element experiences an overstroke in the course of the securing movement, as this reliably allows the adjustment of the clutches to be permanently coupled.

A further embodiment provides a positively locking connection between the second clutch and the clutch locking device. Such a positively locking connection is structurally comparatively easy to realize and operationally safe to implement.

Various embodiments relate to an advantageous refinement of the motor vehicle lock with a freewheel, via which the adjustment mechanisms can be coupled or are coupled to each other. This ensures that—in one direction of the freewheel—the clutches can be adjusted together, and that—in another direction of the freewheel—the clutches can be adjusted independently of each other. This allows certain functions of the motor vehicle lock to be realized, such as a central locking system and/or a theft protection system and/or a child safety device.

In various embodiments, the adjustment mechanisms are advantageously developed structurally.

Various embodiments provide a manually operable unlocking arrangement. Such an arrangement can increase the operational safety and/or the areas of application of the motor vehicle lock, for instance by it being possible for the motor vehicle lock to be manually unlocked from the outside and for the closing element to be opened as a result—even independently of any adjusting drives.

Various embodiments provide that the actuating sections are designed as internal and external actuating sections. Due to the different, correspondingly designed actuating sections, mounting of the motor vehicle lock on or in the closing element of the motor vehicle can be comparatively simple.

According to various embodiments, the motor vehicle lock is designed as a motor-actuable motor vehicle lock, which can be actuated automatically, that is to say by motor, in particular in normal operation.

According to various embodiments, a method for operating a motor vehicle lock as proposed is provided.

All comments in respect of the motor vehicle lock as proposed may be referred to in this respect.

Various embodiments provide a motor vehicle lock for a closing element of a motor vehicle. The motor vehicle lock having a locking mechanism and a release lever for triggering the locking mechanism, the motor vehicle lock having at least two actuating sections for actuating the release lever, a first actuating section having a first clutch, a first adjustment mechanism and a first actuating lever, the first clutch being adjustable via the first adjustment mechanism into a decoupled state and into a coupled state, the first clutch decoupling the first actuating lever and the release lever from each other in the decoupled state and coupling them to each other in the coupled state, a second actuating section having a second clutch, a second adjustment mechanism and a second actuating lever, the second clutch being adjustable via the second adjustment mechanism into a decoupled state and into a coupled state, the second clutch decoupling the second actuating lever and the release lever from each other in the decoupled state and coupling them to each other in the coupled state, wherein the motor vehicle lock has a mechanical clutch locking device, via which the adjustment of the second clutch from the decoupled state into the coupled state can be permanently coupled to the adjustment of the first clutch from the decoupled state into the coupled state.

In various embodiments, in particular at a coupling point, the second adjustment mechanism and the second clutch can be coupled to each other and can be decoupled from each other, and wherein the adjustment of the second coupling can be permanently coupled, in particular is permanently coupled, to the adjustment of the first clutch by decoupling the second clutch from the second adjustment mechanism, in particular at the coupling point, in the course of a securing movement and coupling it to the first clutch via the clutch locking device.

In various embodiments, the securing movement is effected by adjusting the first clutch from the coupled state into the decoupled state, and wherein, the adjustment of the second clutch from the coupled state into the decoupled state by the second adjustment mechanism is at least partially, in particular completely, carried out in time before the securing movement.

In various embodiments, the first clutch has a movable first clutch element, which is moved in the course of adjusting the first clutch from the coupled state into the decoupled state, and/or wherein the second clutch has a movable second clutch element, which is moved in the course of adjusting the second clutch from the coupled state into the decoupled state in a decoupling direction, and wherein the second clutch element experiences an overstroke in the decoupling direction by the clutch locking device during the securing movement.

In various embodiments, the clutch locking device and the first clutch are coupled to each other, in particular via the first adjustment mechanism, and wherein, in the course of the securing movement, the second clutch is coupled to the first clutch via the clutch locking device by a positively locking connection being established between the second clutch, in particular the second clutch element, and the clutch locking device.

In various embodiments, the first adjustment mechanism and the second adjustment mechanism can be coupled or are coupled to each other via a freewheel, such as in such a way that the adjustment of the second clutch from the coupled state into the decoupled state can be effected by the second adjustment mechanism independently of the first adjustment mechanism of the first clutch, which is adjusted into the coupled state, and/or that the adjustment of the first clutch from the coupled state into the decoupled state can be effected by the first adjustment mechanism independently of the second adjustment mechanism of the second clutch, which is adjusted into the decoupled state.

In various embodiments, the first adjustment mechanism has a first adjusting lever which is, in particular, pivotable, and wherein the second adjustment mechanism has a second adjusting lever which is, in particular, pivotable, and wherein the first adjusting lever and the second adjusting lever can be coupled or are coupled to each other via the freewheel in such a way that the first adjusting lever can be driven in an adjustment direction by the second adjusting lever.

In various embodiments, the motor vehicle lock has a manually operable unlocking arrangement for unlocking the motor vehicle lock, wherein manual operation of the second adjustment mechanism can be effected by the unlocking arrangement, further by the second adjusting lever being moved, in particular pivoted, by the unlocking arrangement, which in turn causes the first adjusting lever to be driven, which in turn causes the first clutch to be adjusted into the coupled state and the second clutch into the coupled state.

In various embodiments, the first actuating section is configured as an internal actuating section, and wherein the second actuating section is configured as an external actuating section, wherein the first actuating lever has a first connection point for connecting an internal actuator, in particular an internal handle of the closing element, and wherein the second actuating lever has a second connection point for connecting an external actuator, in particular an external handle of the closing element.

In various embodiments, the motor vehicle lock, in particular the second actuating section, has an actuating drive for motorized actuation of the release lever, wherein the first actuating section has a first adjusting drive for motorized adjustment of the first adjustment mechanism, and/or wherein the second actuating section has a second adjusting drive for motorized adjustment of the second adjustment mechanism, and further wherein the actuating drive and the second adjusting drive are configured as a common multifunction drive.

Various embodiments provide a method for operating a motor vehicle lock as described herein.

BRIEF DESCRIPTION OF THE DRAWINGS

Various aspects explained in greater detail below with reference to a drawing that merely illustrates exemplary embodiments and in which.

DETAILED DESCRIPTION

Figure 1:
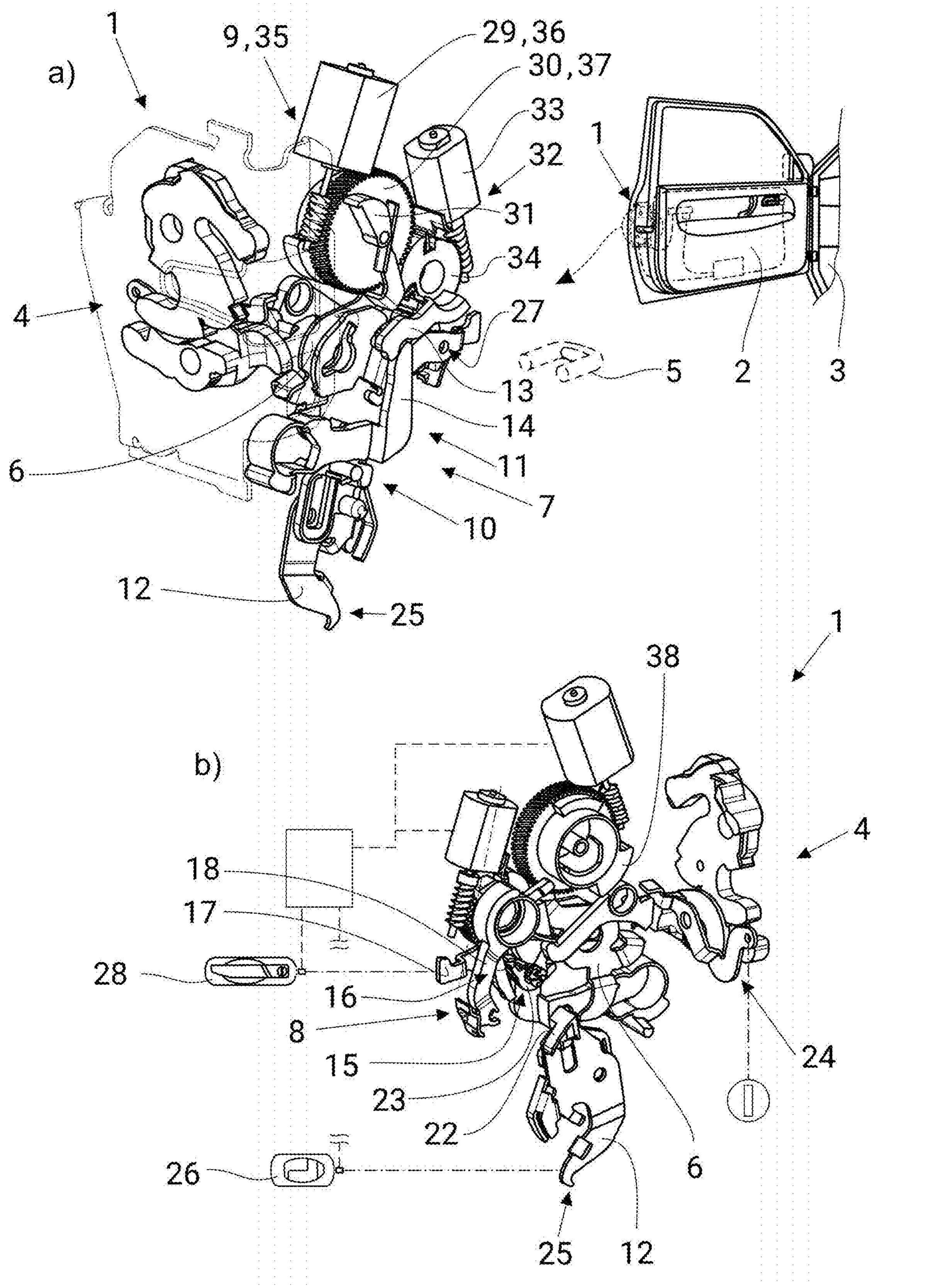
FIG. 1 shows a motor vehicle lock as proposed, which is assigned to a closing element, designed as a side door, of a motor vehicle in a respective perspective illustration, wherein in a) a front view and in b) a rear view is shown.

The exemplary embodiment which is shown in the figures relates to a motor vehicle lock 1 for a closing element 2 of a motor vehicle 3. The motor vehicle lock 1 is assigned, according to FIG. 1*a*), to the closing element 2, here a side door of the motor vehicle 3. As mentioned at the outset, the term "closing element" 2 is to be understood broadly in conjunction with this application.

The motor vehicle lock 1 has a locking mechanism 4. The locking mechanism 4 can, as can be seen for instance from FIGS. 1*a*) and 1*b*), have a lock striker plate and a locking pawl. The lock striker plate can be adjustable into an open position (FIGS. 1*a*) and 1*b*)) and into at least one closed position. In the installed state of the motor vehicle lock 1, the lock striker plate can be engaged in the closed position with a locking part 5. A locking part 5, designed as a striker, is indicated by way of example using dashed lines in FIG. 1*a*). The locking pawl can lock the lock striker plate in the closed position or release the lock striker plate, allowing the lock striker plate to be adjusted from the closed position into the open position.

In order to be able to trigger the locking mechanism 4, the motor vehicle lock 1 has a release lever 6. The release lever 6 can be coupled or is coupled to the locking mechanism 4, with the result that, when the release lever 6 is actuated, the locking mechanism 4 triggers and unlocks accordingly. In this case, for instance, the locking pawl can be lifted and the lock striker plate released, whereupon the lock striker plate pivots and finally the locking part 5 is released. With regard to the structural embodiment of the release lever 6, different embodiments are conceivable, wherein the release lever 6 is, here and in some embodiments, pivotably mounted.

The motor vehicle lock 1 has at least two actuating sections, namely at least one first actuating section 7, which is designed for example as an internal actuating section, and a second actuating section 8, which is designed for example as an external actuating section. The release lever 6 can be actuated via each of the actuating sections. Due to the plurality of actuating sections, it is possible that the motor vehicle lock 1 can be actuated from different points of the motor vehicle 3, for example from the inside and from the outside. The actuating sections can fundamentally actuate the release lever 6 manually and/or by motor, i.e. automatically. Here and in some embodiments, it is provided that the release lever 6 serves as a kind of junction lever, to which a plurality of, in particular all, actuating sections, such as a plurality of actuating levers and/or actuating drives 9, can be attached.

The first actuating section 7 has a first clutch 10, a first adjustment mechanism 11 and a first actuating lever 12. The first clutch 10 is adjustable via the first adjustment mechanism 11 into a decoupled state and into a coupled state, as shown by a combination of FIGS. 2*a*), 2*b*) and 3*a*), 3*b*) and 4*a*), 4*b*) or 5*a*), 5*b*). The first adjustment mechanism 11 can, as here, have a first adjusting lever 13. Furthermore, the first adjustment mechanism 11 can have, as here, a control lever 14, which is arranged, in particular, in drive terms between the first adjusting lever 13 and the first clutch 10. The first actuating lever 12 can be decoupled and coupled from/to the release lever 6 via the first clutch 10. In the decoupled state of the first clutch 10 (e.g. FIGS. 3*a*) and 3*b*)), the first actuating lever 12 and the release lever 6 are decoupled from each other via the first clutch 10. If the first actuating lever 12 is actuated in this decoupled state, the release lever 6 remains inactive and the locking mechanism 4 remains untriggered. In the coupled state of the first clutch 10 (e.g. FIGS. 2*a*), 2*b*), 4*a*), 4*b*) and 5*a*), 5*b*)), the first actuating lever 12 and the release lever 6 are coupled together via the first clutch 10. If, in this coupled state, the first actuating lever 12 is actuated, this causes the release lever 6 to be actuated and the locking mechanism 4 to be triggered. The first clutch 10 enables, for example, the implementation of a theft protection system and/or a child safety device.

The second actuating section 8 has a second clutch 15, a second adjustment mechanism 16 and a second actuating lever 17. As described above in connection with the first actuating section 7, the second clutch 15 is adjustable via the second adjustment mechanism 16 into a decoupled state and into a coupled state, as shown in a summary of FIG. 4*a*), 4*b*) or 5*a*), 5*b*) and 2*a*), 2*b*). The second adjustment mechanism 16 can also have a second adjusting lever 18, as here. The second adjusting lever 18 can, as can be seen for instance from FIG. 1*b*), have several lever booms, of which, for example, one lever boom can adjust the second clutch 15 and another lever boom can support itself against a stop (as, for example, shown in FIG. 2*b*)).

The second actuating lever 17 can be decoupled and coupled from/to the release lever 6 via the second clutch 15. In the decoupled state of the second clutch 15 (e.g. FIGS. 2*a*), 2*b*) and 3*a*), 3*b*)), the second actuating lever 17 and the release lever 6 are decoupled from each other via the second clutch 15. If the second actuating lever 17 is actuated in this decoupled state, the release lever 6 remains inactive and the locking mechanism 4 remains untriggered. In the coupled state of the second clutch 15 (e.g. FIGS. 4*a*), 4*b*) and 5*a*), 5*b*)), the second actuating lever 17 and the release lever 6 are coupled to each other via the second clutch 15. If, in this coupled state, the second actuating lever 17 is actuated, this causes the release lever 6 to be actuated and the locking mechanism 4 to be triggered. The second clutch 15 enables, for example, the implementation of a central locking system and/or, together with the first clutch 10, the implementation of the theft protection system. In general, it can be possible that the second clutch 15 is adjusted into the decoupled state in normal operation of the motor vehicle lock 1.

Figure 2:
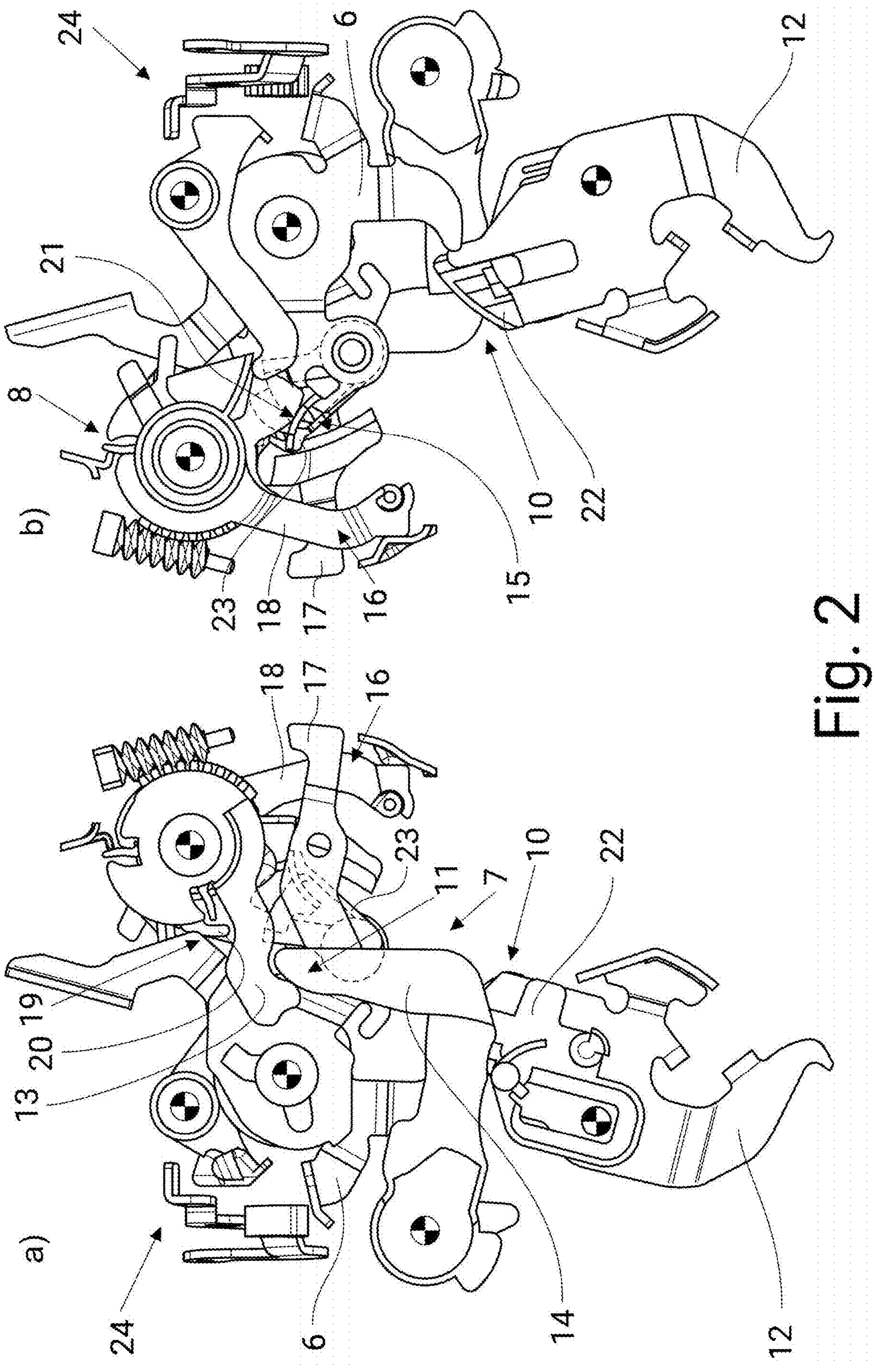
FIG. 2 shows the motor vehicle lock according to FIGS. 1*a*) and 1*b*), wherein a first clutch is adjusted into a coupled state and a second clutch is adjusted into a decoupled state, in a front view (a) and a rear view (b)
Figure 3:
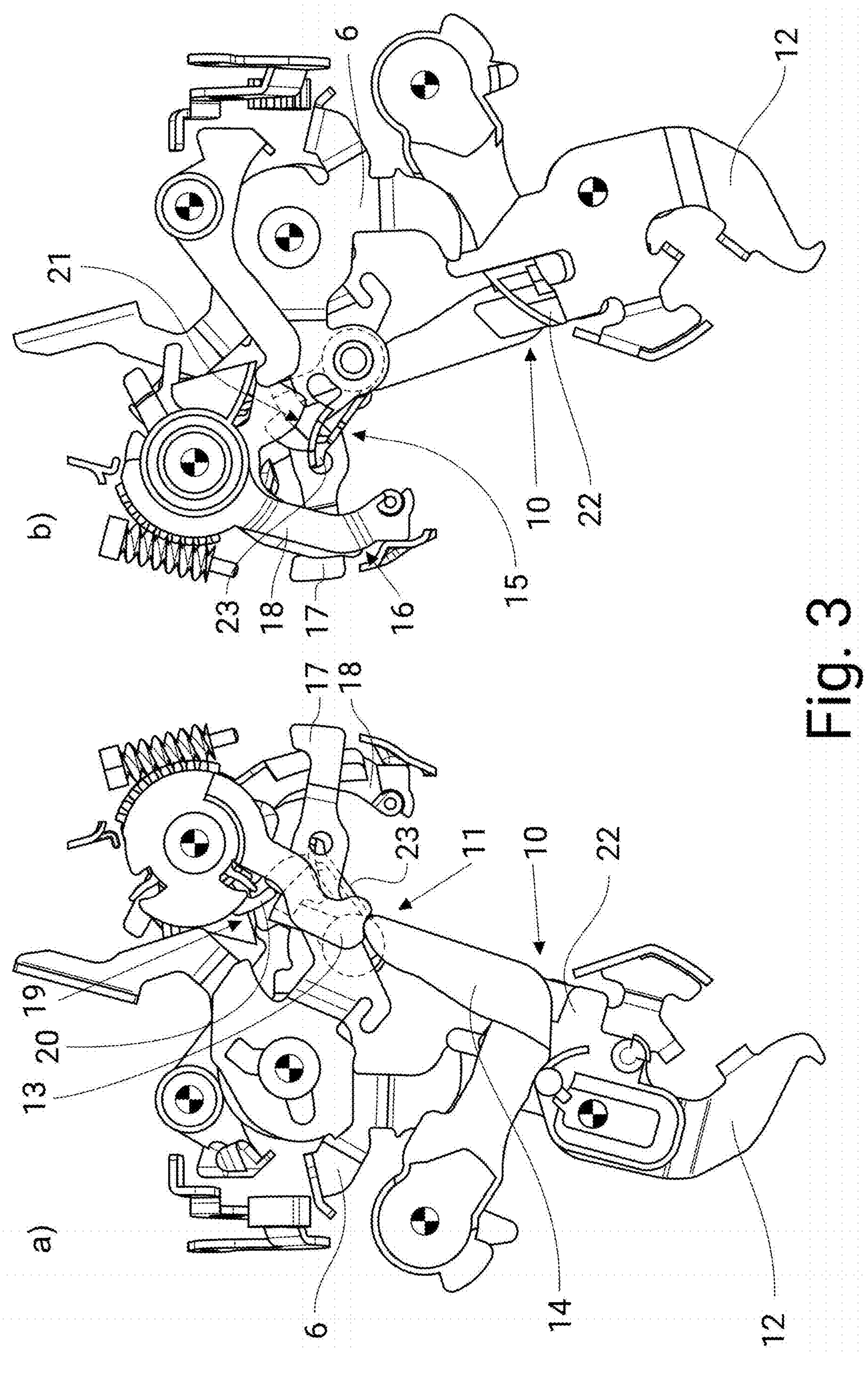
FIG. 3 shows the motor vehicle lock according to FIGS. 1*a*) and 1*b*), wherein the clutches are adjusted into the decoupled state, and the adjustment of the clutches via the clutch locking device is permanently coupled, in a front view (a) and a rear view (b)
Figure 4:
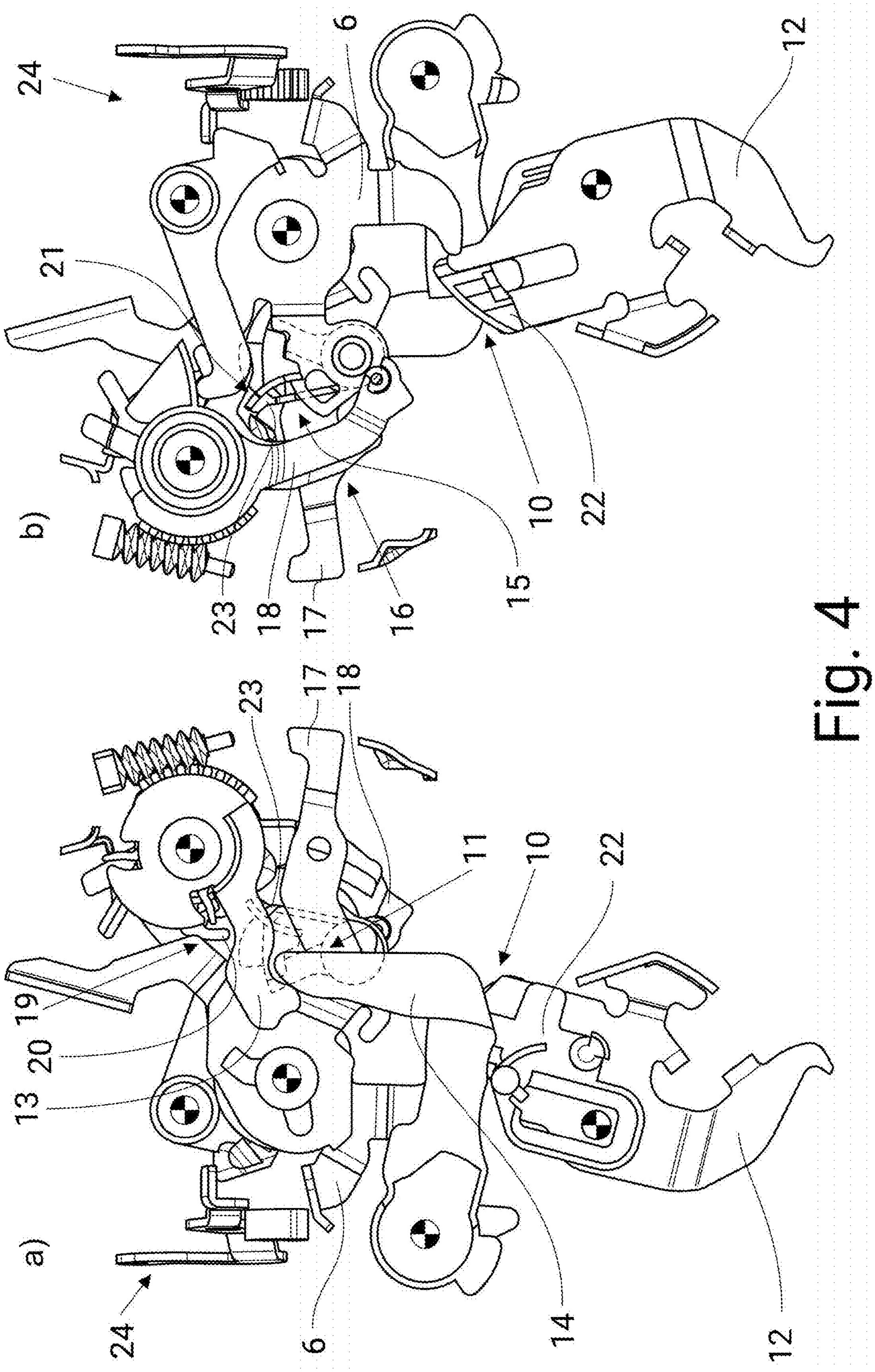
FIG. 4 shows the motor vehicle lock according to FIGS. 1*a*) and 1*b*), wherein the clutches are mechanically adjusted into the coupled state, in a front view (a) and a rear view (b)
Figure 5:
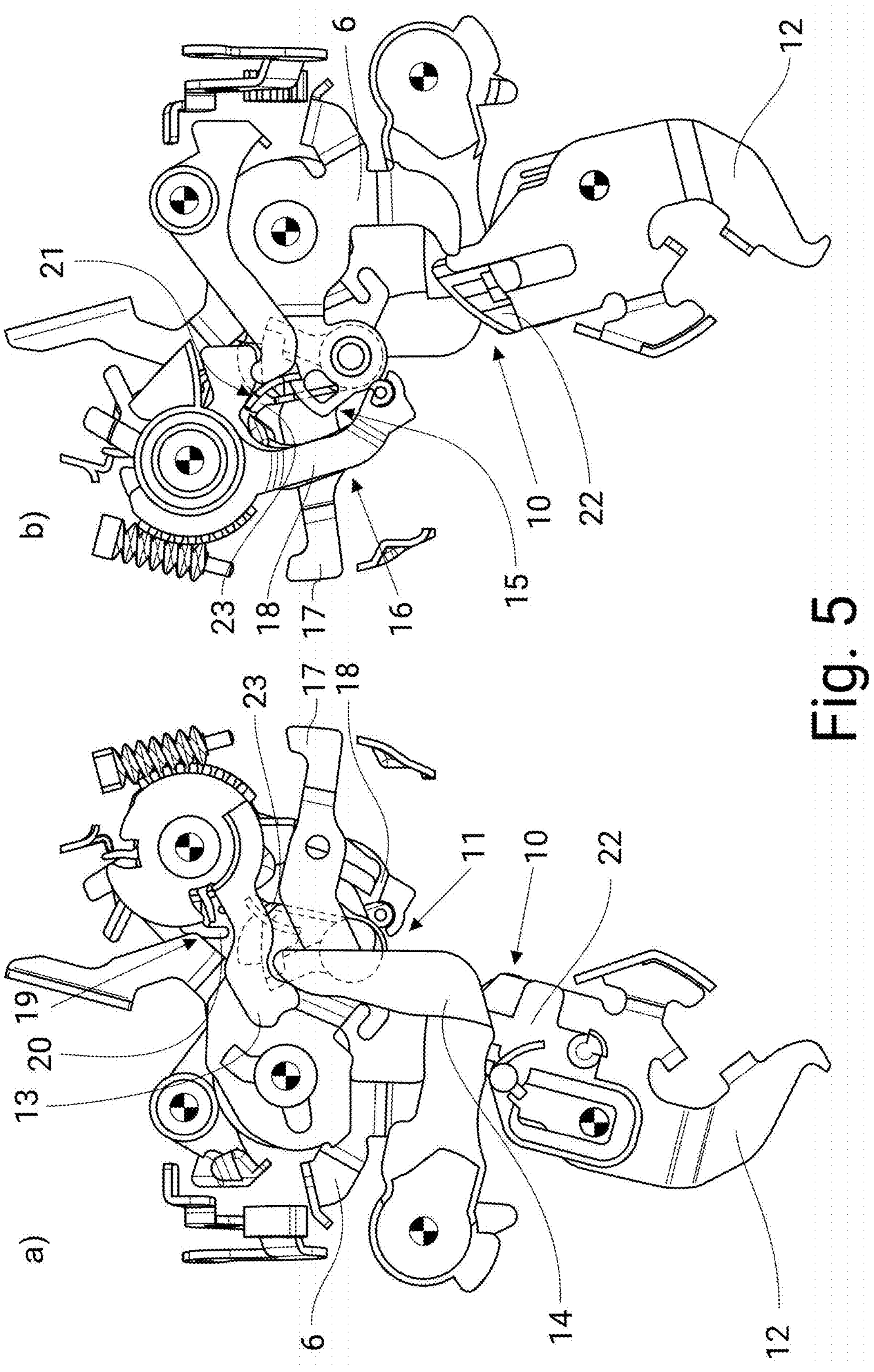
FIG. 5 shows the motor vehicle lock according to FIGS. 1*a*) and 1*b*), wherein the clutches are automatically adjusted into the coupled state, in a front view (a) and a rear view (b).

In FIGS. 2*a*) and 2*b*) the motor vehicle lock 1 is locked (first clutch 10 in the coupled state, second clutch 15 in the decoupled state), in FIGS. 3*a*) and 3*b*) the motor vehicle lock 1 is protected against theft (first clutch 10 in the decoupled state, second clutch 15 in the decoupled state), and in FIGS. 4*a*), 4*b*) and 5*a*), 5*b*) is in each case unlocked (first clutch 10 in the coupled state, second clutch 15 in the coupled state), wherein according to FIGS. 4*a*) and 4*b*) the unlocking of the motor vehicle lock 1 can be done manually and according to FIGS. 5*a*) and 5*b*) by motor, that is, automatically.

It is then essential to the motor vehicle lock 1 that the motor vehicle lock 1 has a mechanical clutch locking device 19, via which the adjustment of the second clutch 15 from the decoupled state into the coupled state can be permanently coupled, in particular is permanently coupled, to the adjustment of the first clutch 10 from the decoupled state into the coupled state. In this respect, the clutch locking device 19 enables the permanent coupling of the adjustment processes of the first clutch 10 and the second clutch 15 from the respective decoupled into the respective coupled state.

The clutch locking device 19 and in particular the permanent coupling of the clutch locking device 19 thus ensure that the adjustment of the second clutch 15 from the decoupled state into the coupled state also necessarily requires the adjustment of the first clutch 10 from the decoupled state into the coupled state. If thus, starting from the decoupled state of the second clutch 15 and the decoupled state of the first clutch 10 (FIGS. 3*a*) and 3*b*)), the second clutch 15 is to be adjusted into the coupled state, the first clutch 10 is thus also necessarily to be adjusted into the coupled state. As a result, the clutch locking device 19 thus ensures that an exclusive adjustment of the second clutch 15 into the coupled state and a retention of the first clutch 10 in the decoupled state is not possible.

In order to implement the fundamental consideration of some embodiments, it is in principle possible that, due to the clutch locking device 19, in particular due to the permanent coupling of the clutch locking device 19, the adjustment of the second clutch 15 from the decoupled state into the coupled state causes the adjustment of the first clutch 10 from the decoupled state into the coupled state. However, it is provided as an alternative and in some embodiments that, due to the clutch locking device 19, in particular due to the permanent coupling of the clutch locking device 19, in the course of adjusting the first clutch 10 from the decoupled state into the coupled state via the first adjustment mechanism 11, the adjustment of the second clutch 15 from the decoupled state into the coupled state is effected. The adjustment of the first clutch 10 is in this case causal for the adjustment of the second clutch 15, with the result that the adjustment of the second clutch 15 requires the prior or simultaneous adjustment of the first clutch 10.

It is possible that the permanent coupling is effected depending on the state of the first clutch 10. This means that the adjustment of the clutches by the clutch locking device 19 is exclusively permanently coupled when the first clutch 10 is adjusted in the decoupled state (FIGS. 3*a*) and 3*b*)) or is adjusted into the decoupled state (combination of FIGS. 2*a*), 2*b*) and 3*a*), 3*b*)). If the first clutch 10 is adjusted for instance into the coupled state (FIGS. 2*a*) and 2*b*)), the second clutch 15 can also be adjusted independently of the first clutch 10 from the decoupled state into the coupled state.

It is possible, furthermore, that the adjustment of the first clutch 10 from the coupled state into the decoupled state and the adjustment of the second clutch 15 from the coupled state into the decoupled state are decoupled from each other. Thus, for example, the second clutch 15 can be adjusted from the coupled state into the decoupled state without this requiring an adjustment of the first clutch 10, as can be seen, for example, from a combination of FIG. 4*a*), 4*b*) or 5*a*), 5*b*) and 2*a*), 2*b*). The first clutch 10 can be adjusted from the coupled state into the decoupled state without this requiring an adjustment of the second clutch 15, as can be seen, for example, from a combination of FIGS. 2*a*), 2*b*) and 3*a*), 3*b*).

The "adjustment" of the first clutch 10 or the second clutch 15 is associated in particular with a change in the state of the corresponding clutch. "Adjusting" therefore does not mean, in particular, a mere movement of a part of the corresponding clutch, such as the mere movement of a clutch element, in which no change in the state of the corresponding clutch takes place.

The mechanical clutch locking device 19 ensures that the permanent coupling can be carried out without any electronic actuations of the clutch locking device 19, that is to say electronic actuations that directly affect the clutch locking device 19. Thus, it is possible that the permanent coupling can be carried out by the clutch locking device 19 due to any dynamics of the components of the motor vehicle lock 1, that is to say, for example, by the positions, the pivoting or shifting of a lever, etc. It can be possible that the clutch locking device 19 causes the permanent coupling by, as here, the first clutch 10 and/or the second clutch 15 being adjusted and/or the first adjustment mechanism 11 and/or the second adjustment mechanism 16 being actuated.

From a design point of view, the clutch locking device 19 can be designed in different ways. In a structurally particularly uncomplicated manner, here and in some embodiments it is provided that the clutch locking device 19 has a securing element 20, as can be seen for example from FIG. 3*a*). The securing element 20 is formed here and in some embodiments in the manner of a projection. The securing element 20 is arranged here and in some embodiments fixedly opposite, in particular on, a first adjusting lever 13 of the first adjustment mechanism 11.

In principle, different possibilities are conceivable to permanently couple the adjustment of the first clutch 10 and the second clutch 15 by the clutch locking device 19. It can be provided, in some embodiments, that the second adjustment mechanism 16 and the second clutch 15 can be coupled to each other and decoupled from each other, and that the adjusting of the second clutch 15 can be permanently coupled, in particular is permanently coupled, to the adjusting of the first clutch 10 by decoupling the second clutch 15 from the second adjustment mechanism 16 in the course of a locking movement and coupling it to the first clutch 10 via the clutch locking device 19. The second adjustment mechanism 16 and the second clutch 15 can be couplable to each other and can be decouplable from each other, in particular at a coupling point 21. In the course of the securing movement, the decoupling of the second clutch 15 from the second adjustment mechanism 16 takes place, in particular at this coupling point 21. This does not require that the second clutch 15 is completely decoupled from the second adjustment mechanism 16 in terms of movement. Nevertheless, the second adjustment mechanism 16 and the second clutch 15 are decoupled from each other at least at the coupling point 21.

In order to effect the permanent coupling, the second clutch 15 can be decoupled from the second adjustment mechanism 16 and coupled to the first clutch 10. This causes the second clutch 15 not to be adjusted by the second adjustment mechanism 16 from the decoupled state into the coupled state, but is adjusted exclusively depending on the adjustment of the first clutch 10 from the decoupled state into the coupled state.

Here and in some embodiments, it is provided that the second clutch 15 is coupled to the first clutch 10 via the clutch locking device 19 and via the first adjustment mechanism 11, as is apparent, for instance, from a combination of FIGS. 2*a*), 2*b*) and 3*a*), 3*b*). Nevertheless, it is also conceivable as an alternative that the second clutch 15 is, in particular exclusively, coupled by the clutch locking device 19 to the first clutch 10 directly, i.e. independently of the first adjustment mechanism 11, for example by arranging the clutch locking device 19, in particular the securing element 20, on a component of the first clutch 10, such as a clutch element.

With regard to the securing movement, different embodiments of the motor vehicle lock 1 are also generally conceivable. In some embodiments, it has proved particularly preferable, in this regard, that the securing movement is effected by adjusting the first clutch 10 from the coupled state into the decoupled state. In the course of adjusting the first clutch 10 from the coupled state (FIGS. 2*a*) and 2*b*)) into the decoupled state (FIGS. 3*a*) and 3*b*)) by the first adjustment mechanism 11, the securing movement is effected. The second clutch 15 can in this case already be adjusted in particular into the decoupled state. A separate locking movement is not required, with the result that the clutch locking device 19 can be configured, as here, as passive clutch locking device 19, without any separate adjusting drives, etc.

Here and in some embodiments, it is provided that the adjustment of the second clutch 15 from the coupled state into the decoupled state by the second adjustment mechanism 16 is at least partially, in particular completely, carried out in time before the securing movement. The temporal sequence of the adjustment of the clutches is obtained for the exemplary embodiment starting from FIG. 4*a*), 4*b*) or 5*a*), 5*b*), in which the first clutch 10 and the second clutch 15 are each in the coupled state, via FIGS. 2*a*) and 2*b*), in which the second clutch 15 is adjusted into the decoupled state, to FIGS. 3*a*) and 3*b*), in which the first clutch 10 is adjusted into the decoupled state and the securing movement has been effected. Here and in some embodiments, the adjustment of the second clutch 15 from the coupled state (FIGS. 4*a*), 4*b*) and 5*a*), 5*b*)) into the decoupled state (FIGS. 2*a*) and 2*b*)) can be carried out by the second adjustment mechanism 16 independently of the securing movement. As a result a central locking system can be particularly simply configured, in which the second actuating lever 17 is coupled to or decoupled from the release lever 6 depending on the state of the second clutch 15.

As an alternative to the configuration of the exemplary embodiment, it is likewise conceivable that the securing movement is carried out in the course of adjusting the second clutch 15 from the decoupled state in the direction of the coupled state. Starting from the first clutch 10 in the decoupled state and the second clutch 15 in the decoupled state, the second adjustment mechanism 16 in this case can initially adjust the second clutch 15 in the direction of the coupled state. In the course of this adjustment, the securing movement takes place and the adjustment of the second clutch 15 is interrupted. The second clutch 15 is then still in the decoupled state. The adjustment of the second clutch 15 is then permanently coupled to the adjustment of the first clutch 10.

The consideration of permanently coupling the adjustment of the second clutch 15 to the adjustment of the first clutch 10 by the clutch locking device 19 can generally be transferred to different types of clutches. Nevertheless, in some embodiments, it has turned out to be particularly preferable if the first clutch 10 has a movable first clutch element 22, which is moved in the course of adjusting the first clutch 10 from the coupled state into the decoupled state. This movement of the first clutch element 22, which is apparent from a combination of FIGS. 2*a*), 2*b*) and 3*a*), 3*b*), is effected by the first adjustment mechanism 11, in particular via the first adjusting lever 13 and the control lever 14. The first clutch element 22 is, here and in some embodiments, mounted linearly movably. The first clutch element 22 is, here and in some embodiments, arranged on the first actuating lever 12. However, it is also conceivable as an alternative that the first clutch element 22 is arranged on the release lever 6.

As an alternative or in addition, it is provided that the second clutch 15 has a movable second clutch element 23, which is moved in the course of adjusting the second clutch 15 from the coupled state into the decoupled state in a decoupling direction. Where the second clutch element 23 is concealed in FIGS. 2*a*) to 5*b*), the outline of the second clutch element 23 is shown using dashed lines for improved understanding. The movement of the second clutch element 23, which can be seen from a combination of FIG. 4*a*), 4*b*) or 5*a*), 5*b*) and 2*a*), 2*b*), becomes effectable by the second adjustment mechanism 16. In the course of the securing movement, the movement of the second clutch element 23, as here, can be effectable by the first adjustment mechanism 11 via the clutch locking device 19, as can be seen from a combination of FIGS. 2*a*), 2*b*) and 3*a*), 3*b*). The second clutch element 23 is, here and in some embodiments, pivotably mounted. In FIGS. 2*b*), 3*b*), 4*b*) and 5*b*), the decoupling direction corresponds to a counterclockwise pivoting direction. Here and in some embodiments, the second clutch element 23 is arranged on the release lever 6. However, as an alternative, embodiments are also conceivable in which the second clutch element 23 is arranged on the second actuating lever 17.

In some embodiments, it is particularly preferably provided in conjunction with the second clutch element 23 that the second clutch element 23 experiences an overstroke by way of the clutch locking device 19 in the decoupling direction in the course of the securing movement. The second clutch element 23 is movable, here and in some embodiments, both by the second adjustment mechanism 16 (combination of FIG. 4*a*), 4*b*) or 5*a*), 5*b*)) and 2*a*), 2*b*)) and by the first adjustment mechanism 11 via the clutch locking device 19 (combination of FIGS. 2*a*), 2*b*) and 3*a*), 3*b*)). First of all, the second clutch element 23 is moved in the decoupling direction by the second adjustment mechanism 16. As a result, the second clutch 15 can already be adjusted from the coupled state into the decoupled state. Then, starting from this, the second clutch element 23 is moved further in the decoupling direction by the first adjustment mechanism 11, with the result that the securing movement takes place and the second clutch element 23 experiences an overstroke in the course of the securing movement. Here and in some embodiments, the second clutch element 23 experiences an overstroke of at least 2°, at least 5°, or at least 10°, and/or of at most 45°, at most 35°, or at most 25°. Here and in some embodiments, the overstroke is effected by the first adjustment mechanism 11.

The clutch locking device 19 and the first clutch 10 can, as here, be couplable to each other or can be coupled to each other. This can, as already described above in a different context, in some embodiments take place via the first adjustment mechanism 11. The securing element 20 of the clutch locking device 19 can be arranged for example, as provided in the exemplary embodiment, fixedly opposite, in particular on, the first adjusting lever 13. Although, in the course of the securing movement between the second clutch 15 and the clutch locking device 19, for instance frictional coupling is conceivable, in some embodiments, it has turned out to be particularly preferable if, in the course of the securing movement, the second clutch 15 is coupled to the first clutch 10 via the clutch locking device 19, by a positively locking connection being established between the second clutch 15, in particular the second clutch element 23, and the clutch locking device 19, in particular the securing element 20 (as, for instance, in FIG. 3*a*)). The term "positively locking connection" is to be broadly understood in this context and comprises connections in which the relative movement between the second clutch 15, in particular the second clutch element 23, and the clutch locking device 19, in particular the securing element 20, is blocked in at least one direction by structural features. This results in a movement of the securing element 20 causing a movement of the second clutch element 23. The positively locking connection is to be gathered for the exemplary embodiment of FIG. 3*a*).

In the exemplary embodiment, it is provided that the first adjustment mechanism 11, in particular the first adjusting lever 13, and the second adjustment mechanism 16, in particular the second adjusting lever 18, can be coupled or are coupled to each other via a freewheel. The freewheel can allow a free-running relative movement between the first adjustment mechanism 11, in particular the first adjusting lever 13, and the second adjustment mechanism 16, in particular the second adjusting lever 18. The free-running relative movement is limited in that, in the course of certain movements of one adjustment mechanism, in particular of one adjusting lever, the other adjustment mechanism, in particular the other adjusting lever, is not moved, and in that, in the course of certain other movements of one adjustment mechanism, in particular of one adjusting lever, the other adjustment mechanism, in particular the other adjusting lever, is moved.

Couplability or coupling via the freewheel can be carried out in such a way that the adjustment of the second clutch 15 from the coupled state (FIGS. 4*a*), 4*b*) and 5*a*), 5*b*)) into the decoupled state (FIGS. 2*a*) and 2*b*)) by the second adjustment mechanism 16 can be effected independently of the first adjustment mechanism 11 of the first clutch 10, which is adjusted into the coupled state. It is thus the case that the first clutch 10, starting from the coupled state in the course of adjusting the second clutch 15, initially remains unadjusted in the coupled state. In the course of adjusting the second clutch 15 from the coupled state into the decoupled state, a free-running relative movement takes place here between the first adjustment mechanism 11, in particular the first adjusting lever 13, and the second adjustment mechanism 16, in particular the second adjusting lever 18, by way of the freewheel.

In some embodiments, it is alternatively or additionally the case that the first adjustment mechanism 11, in particular the first adjusting lever 13, and the second adjustment mechanism 16, in particular the second adjusting lever 18, can be coupled or are coupled to each other via the freewheel in such a way that the adjustment of the first clutch 10 from the coupled state (FIGS. 2*a*) and 2*b*)) into the decoupled state (FIGS. 3*a*) and 3*b*)) by the first adjustment mechanism 11 can be effected independently of the second adjustment mechanism 16 of the second clutch 15, which is adjusted into the decoupled state. It is thus the case that the second clutch 15 initially remains unadjusted in the coupled state starting from the coupled state in the course of adjusting the first clutch 10. In this context, "unadjusted" in particular rules out merely that the state of the second clutch 15 is changed. Nevertheless, it is thereby not ruled out that the second clutch 15 or a part of the second clutch 15, in particular the second clutch element 23, is moved in the course of adjusting the first clutch 10, as is provided in the exemplary embodiment. The decisive factor is that the second adjustment mechanism 16 does not block the movements of the first adjustment mechanism 11 due to the couplability or coupling via the freewheel, at least in the course of the corresponding adjustment of the first clutch 10 in the case of the second clutch 15 having been adjusted into the decoupled state. In the course of adjusting the first clutch 10 from the coupled state into the decoupled state, a free-running relative movement takes place here between the first adjustment mechanism 11, in particular the first adjusting lever 13, and the second adjustment mechanism 16, in particular the second adjusting lever 18, by way of the freewheel.

With regard to the structural embodiment of the adjustment mechanisms, it has been proven, as already mentioned above in another context, if the first adjustment mechanism 11 has a first adjusting lever 13. Here and in some embodiments, the securing element 20 of the clutch locking device 19 is arranged fixedly opposite, in particular on, the first adjusting lever 13, such as in such a way that the securing element 20 is moved with the first adjusting lever 13. The first adjusting lever 13 is, here and in some embodiments, pivotably mounted. The second adjustment mechanism 16 has a second adjusting lever 18. The second adjusting lever

18 is, here and in some embodiments, pivotably mounted. It can be provided, in some embodiments, that the first adjusting lever 13 and the second adjusting lever 18 are pivotable about a common bearing axis, as is shown for the exemplary embodiment from all figures.

The first adjusting lever 13 and the second adjusting lever 18 can be coupled or are coupled to each other via the freewheel in such a way that the first adjusting lever 13 can be driven by the second adjusting lever 18 in, in particular precisely, one driving direction. The driving direction corresponds to one of the adjustment directions of the second adjusting lever 18, which can be moved in two adjustment directions. Starting from the decoupled state of the first clutch 10 and the decoupled state of the second clutch 15 (FIGS. 3*a*) and 3*b*)), the first adjusting lever 13 is driven by the second adjusting lever 18 in the driving direction in the course of a movement of the second adjusting lever 18 (FIGS. 4*a*) and 4*b*)). In FIGS. 2*b*), 3*b*), 4*b*) and 5*b*), the driving direction corresponds to a counterclockwise direction of rotation of the second adjusting lever 18.

It can be provided that the second adjusting lever 18 is movable in a freewheeling manner in a freewheeling direction opposite to the driving direction with respect to the first adjusting lever 13. The freewheeling direction corresponds to the other of the adjustment directions of the second adjusting lever 18, which can be moved in two adjustment directions. Starting from the coupled state of the first clutch 10 and the coupled state of the second clutch 15 (FIGS. 4*a*), 4*b*) and 5*a*), 5*b*)), the second adjusting lever 18 is moved in the freewheeling direction in the course of a movement of the second adjusting lever 18, wherein the first adjusting lever 13 experiences no movement as a result (FIGS. 2*a*) and 2*b*)). The second adjusting lever 18 freewheels correspondingly with respect to the first adjusting lever 13 in the course of a movement of the second adjusting lever 18. In FIGS. 2*b*), 3*b*), 4*b*) and 5*b*), the freewheeling direction corresponds to a clockwise direction of rotation of the second adjusting lever 18.

With regard to the unlocking of the motor vehicle lock 1, it can be provided that the motor vehicle lock 1 has a manually operable unlocking arrangement 24 for manually unlocking the motor vehicle lock 1. FIGS. 4*a*) and 4*b*) show the motor vehicle lock 1 unlocked by the unlocking arrangement 24. The unlocking arrangement 24 can represent a type of locking mechanism. "Manually operable" in this context means that, for adjusting the first clutch 10 into the coupled state and/or for adjusting the second clutch 15 into the coupled state, a manual force which is applied, for example, by turning a key in a lock cylinder by a user is the cause, and in particular that the unlocking of the motor vehicle lock 1 takes place without the activation of any drive. This can be advantageous, for example, in the case that the power supply of the motor vehicle 3 fails and any drives of the motor vehicle lock 1 are accordingly no longer actuable.

Here and in some embodiments, a manual operation of the second adjustment mechanism 16 can be effected by way of the unlocking arrangement 24. This can be done by moving the second adjusting lever 18 via the unlocking arrangement 24, which in turn causes the first adjusting lever 13 to be driven, which in turn causes the first clutch 10 to be adjusted into the coupled state and—due to the clutch locking device 19 and in particular the permanent coupling—the second clutch 15 to be adjusted into the coupled state. This can be seen from a combination of FIGS. 3*a*), 3*b*) and 4*a*), 4*b*).

In principle, the unlocking arrangement 24 can be configured in different ways. Here and in some embodiments, the unlocking arrangement 24 can be connected to a lock cylinder of the closing element 2. The lock cylinder can be lockable by way of a key, in particular from the outside in relation to the motor vehicle 3. The unlocking arrangement 24 has, here and in some embodiments, an unlocking lever. The movement of the unlocking lever causes the manual actuation of the second adjustment mechanism 16, in particular the movement of the second adjusting lever 18.

As already mentioned above in passing, in some embodiments, it has turned out to be preferred with regard to the actuating sections if the first actuating section 7 is designed as an internal actuating section and the second actuating section 8 is designed as an external actuating section. For actuation of the corresponding section, it can be provided that the first actuating lever 12 has a first connection point 25 for connecting an internal actuator 26 and that the second actuating lever 17 has a second connection point 27 for connecting an external actuator 28.

Via the internal actuator 26, a user can actuate the first actuating lever 12 from the inside in relation to the motor vehicle 3. Depending on the state of the first clutch 10 (provided that the first clutch 10 according to FIGS. 4*a*), 4*b*) and 5*a*), 5*b*) is adjusted into the coupled state), the release lever 6 is actuated and thus the locking mechanism 4 is triggered or (provided that the first clutch 10 according to FIGS. 3*a*), 3*b*) is adjusted into the decoupled state) an empty stroke is carried out. In the course of an empty stroke, an actuation of the release lever 6 and thus triggering of the locking mechanism 4 fail to occur. The internal actuator 26 can, as here, be designed in particular as an internal handle (FIG. 1*b*)). The connection of the internal actuator 26 to the first connection point 25 can be effected, for example, via a Bowden cable.

Via the external actuator 28, a user can actuate the second actuating lever 17 from the outside in relation to the motor vehicle lock 1. Depending on the state of the second clutch 15 (provided that the second clutch 15 according to FIGS. 4*a*), 4*b*) and 5*a*), 5*b*) is adjusted into the coupled state), the release lever 6 is actuated and thus the locking mechanism 4 is triggered or (provided that the second clutch 15 according to FIGS. 3*a*) and 3*b*) is adjusted to the decoupled state) an empty stroke is carried out. The external actuator 28 may be designed in particular as an external handle (FIG. 1*b*)). The connection of the external actuator 28 to the second connection point 27 can take place, for example, via a Bowden cable.

Although it is fundamentally conceivable that the motor vehicle lock 1 can be manually operated, for example via the internal actuator 26 and the external actuator 28, it has been particularly proven if the motor vehicle lock 1 can be operated as an alternative or in particular in addition automatically. For this reason, it can be provided that the motor vehicle lock 1 has an actuating drive 9 for motorized actuation of the release lever 6. The release lever 6 can be actuated via the actuating drive 9. The actuating drive 9 has, here and in some embodiments, an actuating motor 29 and a rotatably mounted actuating wheel 30. Via the actuating motor 29, the actuating wheel 30 can be moved in both directions of rotation. The actuating wheel 30 may, as here, have an actuating contour 31 (FIG. 1*a*)). The actuating contour 31 can act in the course of a movement of the actuating wheel 30 in a direction of rotation, in particular directly, on the release lever 6 and actuate this.

Here and in some embodiments, it is provided that the actuating drive 9 is assigned to the second actuating section 8. It is possible that the second actuating lever 17 serves exclusively as an emergency actuating lever. In this case, the actuation of the motor vehicle lock 1 via the external actuator 28 does not take place manually, since the second clutch 15 is adjusted here in normal operation into the decoupled state (FIGS. 2*a*) and 2*b*)), but rather automatically via the actuating drive 9. It is conceivable that when the external actuator 28 is actuated, a switch, button, etc., which triggers a corresponding control signal is actuated.

A certain degree of automatic control is also advantageous in this regard with regard to adjusting the adjustment mechanisms and thus the clutches. Thus, it can be provided that the first actuating section 7 has a first adjusting drive 32 for motorized adjustment of the first adjustment mechanism 11. The first adjusting drive 32 can adjust the first adjustment mechanism 11, in particular the first adjusting lever 13, resulting ultimately in the adjustment of the first clutch 10. Here and in some embodiments, the first adjusting drive 32 has a first adjusting motor 33 and a rotatably mounted first adjusting wheel 34. The first adjusting wheel 34 can, as here, be formed as part of the first adjusting lever 13.

As an alternative or in addition to the first adjusting drive 32, it can be provided that the second actuating section 8 has a second adjusting drive 35 for motorized adjustment of the second adjustment mechanism 16. The second adjusting drive 35 can adjust the second adjustment mechanism 16, in particular the second adjusting lever 18. Depending on the state of the first clutch 10, this can lead to the adjustment of the second clutch 15 from the coupled state into the decoupled state (as results from a combination of FIGS. 5*a*), 5*b*) and 2*a*), 2*b*)) or to driving of the first adjusting lever 13 by the second adjusting lever 18 (as results from a combination of FIGS. 3*a*), 3*b*) and 4*a*), 4*b*)). Here and in some embodiments, the second adjusting drive 35 has a second adjusting motor 36 and a rotatably mounted second adjusting wheel 37. The second adjusting wheel 37 has, here and in some embodiments, an adjusting contour 38. The adjusting contour 38 can act, in the course of a movement of the second adjusting wheel 37, in a direction of rotation on the second adjusting lever 18 and move the latter.

It is provided in the exemplary embodiment and particularly advantageously that the actuating drive 9 and the second adjusting drive 35 are configured as a common multi-function drive. Instead of a separate configuration, the actuating drive 9 and the second adjusting drive 35 are configured accordingly together. The actuating motor 29 and the second adjusting motor 36 are configured as a common motor, and the actuating wheel 30 and the second adjusting wheel 37 are configured as a common drive wheel. The actuating contour 31 and the adjusting contour 38 are arranged on opposite sides, in particular end sides, of the common drive wheel. The multi-function drive is shown for instance in FIGS. 1*a*) and 1*b*). In FIGS. 2*a*) to 5*b*), an illustration has been omitted for reasons of clarity.

The multi-function drive enables, here and in some embodiments, both the motorized actuation of the release lever 6 and the motorized adjustment of the second clutch 15 from the coupled state into the decoupled state, as a result of which the motor vehicle lock 1 is lockable. The multi-function drive thus fulfills an actuation function and a locking function.

It can be provided that the multi-function drive fulfills an unlocking function. This allows the motor vehicle lock 1 to be unlocked automatically, i.e. by motor. Starting from the decoupled state of the first clutch 10 and the decoupled state of the second clutch 15 (FIGS. 3*a*) and 3*b*)), the second adjustment mechanism 16 is adjusted in the course of motorized unlocking, in particular the second adjusting lever 18 is moved (counterclockwise in FIGS. 2*b*), 3*b*) and 4*b*), 5*b*)). The first adjustment mechanism 11 is also adjusted in the process; in particular, the first adjusting lever 13 is also moved. By the permanent coupling of the adjustment of the first clutch 10 and the second clutch 15 by the clutch locking device 19, both clutches are each adjusted from the decoupled state into the coupled state. In FIGS. 5*a*) and 5*b*), the motor vehicle lock 1 is shown after the motorized unlocking via the multi-function drive. The unlocking function can be triggered automatically, for example in the event of a crash, with the result that the motor vehicle lock 1 can be unlocked after the crash in any case and the closing element 2 of the motor vehicle 3 can be opened—in particular from the inside and from the outside. Here and in some embodiments, the multi-function drive has an unlocking contour. The actuating contour 31 and the unlocking contour are arranged, here and in some embodiments, on opposite sides, in particular end sides, of the common drive wheel.

In addition to the motor vehicle lock 1, a method for operating a motor vehicle lock 1 according to the proposal is also proposed. The motor vehicle lock 1 may in this case have one or more of the features described above.

Reference may be made in this regard to all the embodiments of the motor vehicle lock 1 according to the proposal.

The invention claimed is:

1. A motor vehicle lock for a closing element of a motor vehicle, the motor vehicle lock comprising a locking mechanism and a release lever for triggering the locking mechanism, the motor vehicle lock comprising at least two actuating sections for actuating the release lever, a first actuating section comprising a first clutch, a first adjustment mechanism and a first actuating lever, the first clutch being adjustable via the first adjustment mechanism into a decoupled state and into a coupled state, the first clutch decoupling the first actuating lever and the release lever from each other in the decoupled state and coupling them to each other in the coupled state, a second actuating section comprising a second clutch, a second adjustment mechanism and a second actuating lever, the second clutch being adjustable via the second adjustment mechanism into a decoupled state and into a coupled state, the second clutch decoupling the second actuating lever and the release lever from each other in the decoupled state and coupling them to each other in the coupled state, wherein the motor vehicle lock comprises a mechanical clutch locking device, via which the adjustment of the second clutch from the decoupled state into the coupled state can be permanently coupled to the adjustment of the first clutch from the decoupled state into the coupled state such that the adjustment of the second clutch from the decoupled state into the coupled state also necessarily requires the adjustment of the first clutch from the decoupled state into the coupled state when the first clutch is in the decoupled state, wherein the first clutch is in the coupled state, the second clutch is configured to be adjusted independently of the first clutch.

2. The motor vehicle lock as claimed in claim 1, wherein the second adjustment mechanism and the second clutch can be coupled to each other and can be decoupled from each other, and wherein the adjustment of the second coupling can be permanently coupled to the adjustment of the first clutch by decoupling the second clutch from the second adjustment mechanism in the course of a securing movement and coupling it to the first clutch via the clutch locking device.

3. The motor vehicle lock as claimed in claim 2, wherein the securing movement is effected by adjusting the first clutch from the coupled state into the decoupled state.

4. The motor vehicle lock as claimed in claim 1, wherein the first clutch comprises a movable first clutch element, which is moved in the course of adjusting the first clutch from the coupled state into the decoupled state, and/or wherein the second clutch comprises a movable second clutch element, which is moved in the course of adjusting the second clutch from the coupled state into the decoupled state in a decoupling direction.

5. The motor vehicle lock as claimed in claim 1, wherein the clutch locking device and the first clutch are coupled to each other and wherein, in the course of the securing movement, the second clutch is coupled to the first clutch via the clutch locking device by a positively locking connection being established between the second clutch and the clutch locking device.

6. The motor vehicle lock as claimed in claim 1, wherein the first adjustment mechanism and the second adjustment mechanism can be coupled or are coupled to each other via a freewheel.

7. The motor vehicle lock as claimed in claim 1, wherein the first adjustment mechanism comprises a first adjusting lever which is pivotable, and wherein the second adjustment mechanism comprises a second adjusting lever which is pivotable.

8. The motor vehicle lock as claimed in claim 1, wherein the motor vehicle lock comprises a manually operable unlocking arrangement for unlocking the motor vehicle lock.

9. The motor vehicle lock as claimed in claim 1, wherein the first actuating section is configured as an internal actuating section, and wherein the second actuating section is configured as an external actuating section.

10. The motor vehicle lock as claimed in claim 1, wherein the motor vehicle lock comprises an actuating drive for motorized actuation of the release lever.

11. A method for operating a motor vehicle lock as claimed in claim 1.

12. The motor vehicle lock as claimed in claim 3, wherein the adjustment of the second clutch from the coupled state into the decoupled state by the second adjustment mechanism is at least partially carried out in time before the securing movement.

13. The motor vehicle lock as claimed in claim 4, wherein the second clutch element experiences an overstroke in the decoupling direction by the clutch locking device during the securing movement.

14. The motor vehicle lock as claimed in claim 6, wherein the adjustment of the second clutch from the coupled state into the decoupled state can be effected by the second adjustment mechanism independently of the first adjustment mechanism of the first clutch, which is adjusted into the coupled state, and/or wherein the adjustment of the first clutch from the coupled state into the decoupled state can be effected by the first adjustment mechanism independently of the second adjustment mechanism of the second clutch, which is adjusted into the decoupled state.

15. The motor vehicle lock as claimed in claim 7, wherein the first adjusting lever and the second adjusting lever can be coupled or are coupled to each other via the freewheel in such a way that the first adjusting lever can be driven in an adjustment direction by the second adjusting lever.

16. The motor vehicle lock as claimed in claim 8, wherein manual operation of the manually operable unlocking arrangement can be effected by the unlocking arrangement, by the second adjusting lever being moved by the unlocking arrangement, which in turn causes the first adjusting lever to be driven, which in turn causes the first clutch to be adjusted into the coupled state and the second clutch into the coupled state.

17. The motor vehicle lock as claimed in claim 16, wherein by the second adjusting lever being moved by the unlocking arrangement, which in turn causes the first adjusting lever to be driven, which in turn causes the first clutch to be adjusted into the coupled state and the second clutch into the coupled state.

18. The motor vehicle lock as claimed in claim 9, wherein the first actuating lever comprises a first connection point for connecting an internal actuator, and wherein the second actuating lever comprises a second connection point for connecting an external actuator.

19. The motor vehicle lock as claimed in claim 10, wherein the first actuating section comprises a first adjusting drive for motorized adjustment of the first adjustment mechanism, and/or wherein the second actuating section comprises a second adjusting drive for motorized adjustment of the second adjustment mechanism.

20. The motor vehicle lock as claimed in claim 19, wherein the actuating drive and the second adjusting drive are configured as a common multi-function drive.

* * * * *